(12) United States Patent
Guo et al.

(10) Patent No.: US 11,130,108 B2
(45) Date of Patent: Sep. 28, 2021

(54) TESTING METHOD FOR EVALUATING THE EFFECT OF CO2 REACTION RATE OF ACID ROCK PLATE

(71) Applicant: SOUTHWEST PETROLEUM UNIVERSITY, Chengdu (CN)

(72) Inventors: Jianchun Guo, Chengdu (CN); Xiao Li, Chengdu (CN); Chao Liu, Chengdu (CN); Bo Gou, Chengdu (CN); Xiangzeng Wang, Chengdu (CN); Shiyan Hao, Chengdu (CN); Ruimin Gao, Chengdu (CN); Feng Shen, Chengdu (CN); Nianxi Wang, Chengdu (CN); Jinqiao Wu, Chengdu (CN); Jun Ni, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 2 days.

(21) Appl. No.: 16/878,638

(22) Filed: May 20, 2020

(65) Prior Publication Data
US 2020/0282373 A1 Sep. 10, 2020

(30) Foreign Application Priority Data
Feb. 26, 2020 (CN) .......................... 202010119923.4

(51) Int. Cl.
*B01F 15/00* (2006.01)
*B01F 15/06* (2006.01)
(Continued)

(52) U.S. Cl.
CPC ...... *B01F 15/065* (2013.01); *B01F 15/00149* (2013.01); *B01F 15/00162* (2013.01);
(Continued)

(58) Field of Classification Search
CPC .............. B01F 15/065; B01F 15/00149; B01F 15/00162; B01F 15/00175; B01F 2015/062; G01F 13/00; G01F 23/00; G01L 11/00
See application file for complete search history.

(56) References Cited

U.S. PATENT DOCUMENTS

2003/0054962 A1* 3/2003 England .................. C09K 8/94
507/117
2019/0055828 A1* 2/2019 Babcock ............... E21B 43/255

FOREIGN PATENT DOCUMENTS

CN 102720488 B 10/2014
CN 105388249 A 3/2016

* cited by examiner

*Primary Examiner* — Anshu Bhatia (57) ABSTRACT

The invention discloses a testing device and method for evaluating effects of $CO_2$ reaction rate of acid rock plate. The testing device includes an acid fluid conveying unit, a $CO_2$ conveying unit, a mixing tank, a plate holder, a recycling fluid tank, and a vacuum pump. The mixing tank includes an acid fluid inlet, a $CO_2$ inlet, and a miscible fluid outlet. The acid fluid inlet is connected with the acid fluid conveying unit, the $CO_2$ inlet is connected with the $CO_2$ conveying unit, the miscible fluid outlet is connected with the plate holder, the plate holder is connected with the recycling fluid tank, and the recycling fluid tank is connected to the vacuum pump. The $CO_2$ conveying unit includes a $CO_2$ cylinder and a gas booster pump which is connected to the cylinder. The outlet of the pump is connected to the gas inlet of the mixing tank.

3 Claims, 3 Drawing Sheets

(51) Int. Cl.
  *C09K 8/70* (2006.01)
  *C09K 8/72* (2006.01)
  *G01F 13/00* (2006.01)
  *G01F 23/00* (2006.01)
  *G01L 11/00* (2006.01)
(52) U.S. Cl.
  CPC ........ *B01F 15/00175* (2013.01); *C09K 8/703* (2013.01); *C09K 8/72* (2013.01); *G01F 13/00* (2013.01); *G01F 23/00* (2013.01); *G01L 11/00* (2013.01); *B01F 2015/062* (2013.01)

TESTING METHOD FOR EVALUATING THE EFFECT OF CO2 REACTION RATE OF ACID ROCK PLATE

BACKGROUND OF THE INVENTION

Field Of The Invention

The present invention relates to the technical field of oil and gas development, in particular to testing device and method for evaluating effects of $CO_2$ reaction rate of acid rock plate.

Description Of Related Art

In recent years, a study on CO2 sand fracturing technology has been conducted in many oil and gas fields in China. This technology only applies to sandstone and shale oil and gas reservoirs. It is in the initial stage to apply the technologies of combining CO2 and acid fluid to the acid fracturing stimulation of low-permeability heterogeneous carbonate oil and gas reservoirs. For example, an experiment (Sanchez Bernal, M., Tate, J., Idris, M., Soriano, J. E., Lopez, A. E., & Fatkhutdinov, D.. Acid Fracturing Tight Gas Carbonates Reservoirs Using CO2 to Assist Stimulation Fluids: An Alternative to Less Water Consumption while Maintaining Productivity [C]. SPE 172913-MS) of acid fluid injection with CO2 in acid fracturing was conducted in foreign countries, and a patent for an invention (Application No.: 201910843809.3) in China discloses a CO2 acid fracturing method for low-permeability heterogeneous carbonate gas reservoirs. The reaction rate of acid rock is a key factor that directly determines the effective distance of acid fluid, and then affects the effect of acid fracturing stimulation. Therefore, the analysis and evaluation of the effect of CO2 on acid rock reaction and the accurate calculation of acid rock reaction rate are of great significance for improving the effect of CO2 acid fracturing.

A patent for an invention (Application No.: 201210239116.1) in China discloses a testing device and method for simulating the chemical reaction of acid rock plate. The testing device has the following disadvantages. (1) It is difficult to realistically simulate the chemical reaction of supercritical CO2, acid miscible fluid and rock in the formation because there is no device for mixing supercritical CO2 and acid. If they are mixed directly in the pipe, it is easy to form a sluggish miscible fluid, which will not reach a uniform mixing state. (2) The pipe is not designed with a thermal insulation layer during the whole process, which will cause heat loss when the fluid flows, failing to generate stable supercritical CO2 and realistically simulate the chemical reaction of CO2, acid miscible fluid and rocks in the formation. (3) The volume of CO2 injected cannot be measured, and the pressure of CO2 injected in the recycling fluid tank cannot be accurately calculated, so it is impossible to evaluate the effect of CO2 on the acid rock reaction.

SUMMARY OF THE ININVENTION

The purpose of the present invention is to provide a testing device and method for evaluating effects of $CO_2$ reaction rate of acid rock plate, in view of the failure of the existing testing device for acid rock plate reaction to simulate the chemical reaction of $CO_2$, acid miscible fluid and rock in the formation, so as to simulate the chemical reaction of $CO_2$, acid miscible fluid and rock in construction and accurately calculate the reaction rate of acid rock to guide the optimization of construction scheme design.

The testing device for evaluating effects of $CO_2$ reaction rate of acid rock plate provided by the present invention comprises an acid fluid conveying unit, a $CO_2$ conveying unit, a mixing tank, a plate holder, a recycling fluid tank, and a vacuum pump. The mixing tank is provided with an acid fluid inlet, a $CO_2$ inlet, and a miscible fluid outlet. The acid fluid inlet is connected with the acid fluid conveying unit, the $CO_2$ inlet is connected with the $CO_2$ conveying unit, the miscible fluid outlet is connected with the plate holder, the plate holder is connected with the recycling fluid tank, and the recycling fluid tank is connected to the vacuum pump.

Wherein, the $CO_2$ conveying unit comprises a $CO_2$ cylinder and a gas booster pump which is connected to the cylinder. A gas flowmeter and a pressure sensor are fixed on the pipe connected from the $CO_2$ cylinder to the gas booster pump. The outlet of the gas booster pump is connected to the gas inlet of the mixing tank.

The acid fluid conveying unit includes an acid fluid tank and a plunger pump through which the acid fluid in the acid fluid tank is pumped into the mixing tank.

The mixing tank is sealed in such way that the external surface of the tank is wrapped with a heating jacket which is preferably a water-bath heating jacket, and a temperature sensor and a pressure sensor are provided inside the tank; the miscible fluid outlet of the mixing tank is connected to a fluid flowmeter, a plunger pump and a plate holder in order; the fluid outlet of the plate holder is successively connected with a back pressure valve and a recycling fluid tank; the pipe connected between the mixing tank and the plate holder is externally wrapped with a insulation layer; the recycling fluid tank is internally provided with an electromagnetic level gauge and a pressure sensor; the pressure of the gas booster pump and the temperature in the mixing tank are controlled to make the pressure and temperature in the mixing tank reach to the critical pressure and temperature of supercritical $CO_2$ to obtain supercritical $CO_2$, and the miscible fluid obtained is the mixture of supercritical $CO_2$ and acid fluid.

The main body of the plate holder is a rectangular box, the left and right ends of the box are respectively provided with a fluid inlet and a fluid outlet, the internal flow channels of the fluid inlet and fluid outlet are provided with flared guide grooves, the flared ends of the two grooves are opposite each other and facing to the interior of the plate holder, and a rock plate installation cavity is arranged between the flared inlet guide groove and the flared outlet guide groove. the rock plates are two identical rectangular rock plates cut from the formation rock, one plate is overlapped on the other plate, the gap between the rock plates is simulated as the fracture, the sides of the rock plate are attached with anti-corrosion rubber, the outer side of the rubber is covered with steel plate, the plate holder and the side opposite to the steel plate are fixed with at least four fastening screws, the tightness of the fastening screws can be adjusted to push the steel plate to press the rubber for sealing the sides of the rock plate. The left or the right side of the plate holder is provided with a heater hole for inserting an electric heating rod.

In the testing device of the present invention, the water bath heating jacket wraps the outer surface of the mixing tank for heating, and heats the fluid in the mixing tank to the supercritical temperature of $CO_2$. A rock plate is placed in the cavity of the plate holder, and an electric heating rod is mounted in the cavity to heat the plate holder and the rock plate to the formation temperature. A back pressure valve is fixed in the mixing tank to ensure the uniform mixing and mutual dissolution of stable supercritical $CO_2$ and the acid fluid. The plate holder is provided with a pipe insulation layer at the inlet and a back pressure valve at the outlet to generate stable supercritical $CO_2$ for realistically simulating the chemical reaction of $CO_2$, acid miscible fluid and rock in the formation. The vacuum pump ensures that it is in complete vacuum state in the whole test process, eliminating air interference, and improving the accuracy of experimental data. The recycling fluid tank is made of steel, with PTFE-coated inner wall, and is internally provided with an electromagnetic level gauge, not only making the tank resistant to corrosion and pressure, but also facilitating to the accurate reading of the fluid volume in the tank. The gas flowmeter and the fluid flowmeter can accurately record the volumes of gas and fluid, and the volume of $CO_2$ injected into the holder under the standard condition can be calculated in combination with the readings of the flowmeters and the pressure sensor.

As for the testing device for evaluating effects of $CO_2$ reaction rate of acid rock plate, its working principle for testing and calculating the reaction rate of the acid rock is as follows:

According to the Boyle-Mariotte law $PV_b = P_a V_a$, under the standard condition of 25° C. and $1.013 \times 10^5$ Pa the volume of $CO_2$ injected into the cylinder is:

$$V_b = \frac{P_a V_a}{P}. \tag{1}$$

The standard volume of $CO_2$ in the recycling fluid tank in any time is:

$$V'_j = \frac{P_j V_j}{P}. \tag{2}$$

The percentage of pumped miscible fluid at any time is:

$$\omega_j = \frac{V_c}{V_o}. \tag{3}$$

The standard volume of co-injected $CO_2$ participating in the reaction at any time is:

$$V_d = V_b \omega_j \tag{4}$$

The standard volume of $CO_2$ produced by acid rock reaction at any time is:

$$V_e = V'_j - V_d \tag{5}$$

The amount of substance of $CO_2$ produced by acid rock reaction at any time is:

$$n_{CO_2}^j = \frac{V_e}{V_m}. \tag{6}$$

According to the stoichiometric formula of acid rock reaction $2HCl \rightarrow CO_2 \uparrow$, the amount of substance of acid participating in the reaction at any time is:

$$n_{HCl}^j = 2 n_{CO_2}^j \tag{7}$$

The acid concentration after reaction at any time is:

$$C_j = \frac{CV_{HCl} - n_{HCl}^j}{V_{HCl}}. \tag{8}$$

The reaction rate of the acid rock is:

$$J = -\frac{Q}{A} \cdot (C_j - C) \cdot 10^{-3}. \tag{9}$$

Substitute Formulas (1), (2), (3), (4), (5), (6), (7) and (8) into Formula (9) gives the calculation formula of acid rock reaction rate:

$$J = \frac{2Q(P_j V_j - P_a V_a \omega_j)}{APV_m V_{HCl}} \cdot 10^{-3}.$$

Where, P refers to the pressure under standard conditions, with a constant of $1.013 \times 10^5$ Pa; Pa refers to refers to the pressure for injecting $CO_2$ into the $CO_2$ cylinder Pa; $P_j$ refers to the pressure of the recycling fluid tank at any time, in Pa, j=1, 2, . . . ; $V_a$ refers to the volume of $CO_2$ injected in the cylinder, in L; $V_b$ refers to the standard volume of $CO_2$ injected in the cylinder, in L; $V_c$ refers to the volume of miscible fluid injected, in L; $V_d$ refers to the standard volume of co-injected $CO_2$ participating in the reaction at any time, in L; $V_e$ refers to the standard volume of $CO_2$ produced by acid rock reaction at any time, in L; $V_j$ refers to the volume of $CO_2$ in the recycling fluid tank at any time, in L, j=1, 2, . . . ; $V'_j$ refers to the standard volume of $CO_2$ in the recycling fluid tank in any time, in L, j=1, 2, . . . ; $V_o$ refers to the volume of the mixing tank, in L; $n_{CO_2}^j$ refers to the amount of substance of $CO_2$ produced by acid rock reaction at any time, in mol; $V_m$ refers to the molar volume of gas under standard conditions, with a constant of 24.5, in L/mol; $n_{HCl}^j$ refers to the amount of substance of acid participating in the reaction at any time, in mol; C refers to the acid concentration before reaction, in mol/L; $V_{HCl}$ refers to the volume of acid participating in the reaction at any time, in L; $C_j$ refers to the acid concentration after reaction at any time, in mol/L; Q refers to the acid injection rate, in cm³/s; A refers to the reaction area of acid rock, in cm²; J refers to the reaction rate of the acid rock, in mol/s·cm².

The reaction rate of acid rock is calculated according to Formula (10), so that it is necessary to conduct experiments with the testing device for evaluating the effect of $CO_2$ on the reaction rate of acid rock plate to measure the parameters required by Formula (10), and calculate the reaction rate of the acid rock.

As for the testing method for using the testing device for evaluating the effect of $CO_2$ on the reaction rate of acid rock plate, the specific steps are as follows:

Step 1: installing the plate holder and the whole testing device to ensure the air tight sealing of the whole device; wherein the plate holder is installed in such a way that one plate is overlapped on the other plate, the gap between the rock plates is simulated as the fracture, the two sides of the rock plate along the direction of fluid flow are attached with anti-corrosion rubber, the outer side of the rubber is covered with steel plate and placed in the inner cavity of the plate holder, and the steel plate is fixed with fastening screws onto the side of the plate holder opposite to the steel plate.

Step 2: turning on the vacuum pump to ensure that the whole testing device is completely vacuum in operation, and turning off the vacuum pump and zero the pressure gauge.

Step 3: using the gas booster pump to inject gaseous $CO_2$ into the mixing tank with a certain displacement, recording the readings of the pressure sensor and the gas flowmeter, using the plunger pump to inject hydrochloric acid into the mixing tank with a certain displacement, controlling the pressure and temperature in the mixing tank to reach to the supercritical pressure and temperature of $CO_2$, and uniformly mixing the supercritical $CO_2$ and the acid fluid to obtain the miscible fluid.

Step 4: after the temperature of the mixing tank is stable, setting the outlet back pressure, pumping the miscible fluid with the plunger pump into the plate holder to enable acid rock reaction, recording the volume of $CO_2$ in the recycling fluid tank at any time, and finally calculating the reaction rate of the acid rock at any time with the following formula:

$$J = \frac{2Q(P_j V_j - P_a V_a \omega_j)}{APV_m V_{HCl}} \cdot 10^{-3}.$$

Where, J refers to the reaction rate of acid rock mol/s·cm$^2$;
Q refers to acid injection rate, in cm$^3$/s;
$V_j$ refers to the volume of $CO_2$ in the recycling fluid tank at any time, in L, j=1, 2, . . . ;
$P_j$ refers to the pressure of the recycling fluid tank at any time, in Pa, j=1, 2, . . . ;
$P_a$ refers to the pressure for injecting $CO_2$ into the $CO_2$ cylinder, in Pa;
$V_a$ refers to the volume of $CO_2$ injected in the $CO_2$ cylinder, in L;
$\omega_j$ refers to the percentage of pumped miscible fluid at any time;
A refers to the reaction area of acid rock, in cm$^2$;
P refers to the pressure under standard conditions, with a constant of $1.013 \times 10^5$ in Pa;
$V_m$ refers to the molar volume of gas under standard conditions, with a constant of 24.5, in L/mol;
$V_{HCl}$ refers to the volume of acid participating in the reaction at any time, in L.

In the above method, the electromagnetic level gauge accurately reads the fluid volume in the tank. The gas flowmeter and the fluid flowmeter can accurately record the volumes of gas and fluid, and the volume of $CO_2$ injected into the holder under the standard condition can be calculated in combination with the readings of the flowmeters and the pressure sensor. Finally, the reaction rate of acid rock at any time is calculated.

Compared with the prior art, the present invention has the following beneficial effects:

(1) It integrates the functions of temperature and pressure control, mixing, and displacement, realizing the uniform mixing and mutual dissolution of stable supercritical $CO_2$ and acid fluid, and realistically simulating the chemical reaction of $CO_2$, acid miscible fluid and rock in the formation. (2) The pipe is designed with a thermal insulation layer to effectively reduce the heat loss when the fluid flows and generate stable supercritical $CO_2$ for realistically simulating the chemical reaction of $CO_2$, acid miscible fluid and rock in the formation. (3) The volume of $CO_2$ before mixing is accurately measured, and then the pressure of $CO_2$ injected in the recycling fluid tank is accurately calculated to evaluate the effect of $CO_2$ on the reaction of acid rock. (4) With the testing device and method, it is possible to realistically simulate the chemical reaction of $CO_2$ acid miscible fluid and rock during the construction, test the reaction rate of acid rock under different environmental conditions, so as to provide guidance for applying reasonable $CO_2$ acid fracturing technologies to the improvement of the effect of acid fracturing. (5) The testing device of the present invention is advantaged by reliable principles, simple structure and practical testing method. The present invention can not only be used to accurately calculate the reaction rate of acid rock, but also analyze and evaluate the effect of $CO_2$ on the reaction of acid rock plate. It overcomes the defects of the prior art, and provides special devices and testing methods for the research in the field.

Other advantages, objectives and characteristics of the present invention will be partly embodied by the following description, and partly understood by those skilled in the art through research and practice of the present invention.

BRIEF DESCRIPTION OF THE DRAWINGS

Aspects of the present invention are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE PREFERRED EMBODIMENTS

In the following detailed description of the preferred embodiments of the present invention, reference is made to the accompanying drawings. It is to be understood that the preferred embodiments described herein are only used to illustrate and interpret the present invention and are not intended to limit the present invention.

Figure 1:
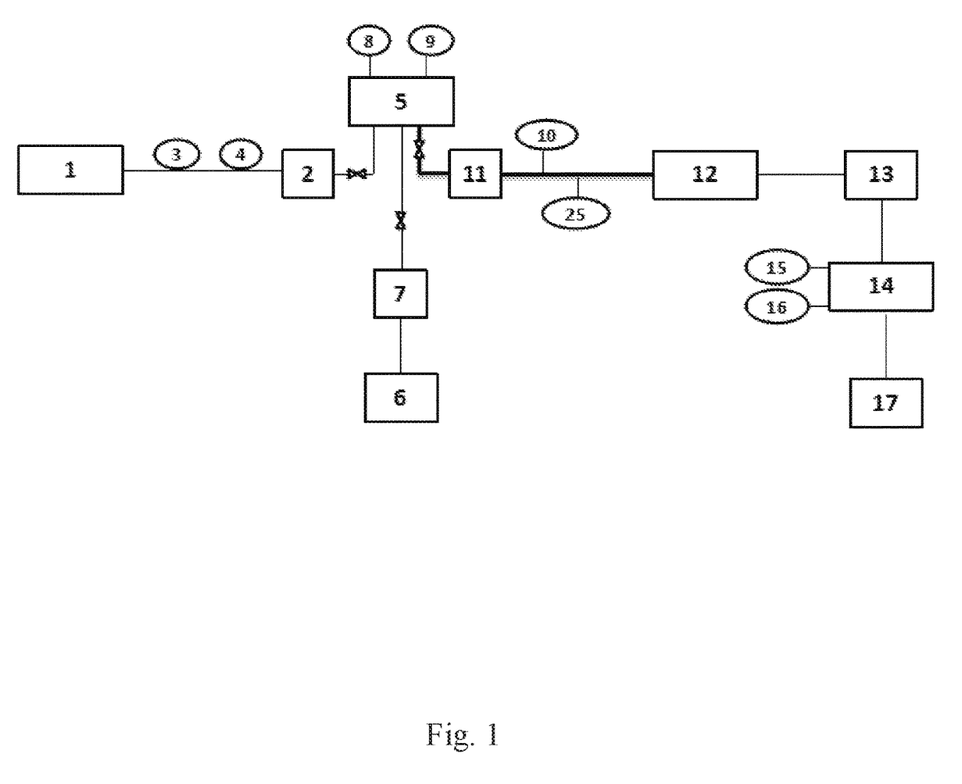
FIG. 1 is a schematic diagram of a structure of a testing device for evaluating effects of $CO_2$ reaction rate of acid rock plate of the present invention.

As shown in FIG. 1, the testing device for evaluating effects of $CO_2$ reaction rate of acid rock plate provided by the present invention comprises an acid fluid conveying unit, a $CO_2$ conveying unit, a mixing tank 5, a plate holder 12, a recycling fluid tank 14, and a vacuum pump 17. The mixing tank 5 is provided with an acid fluid inlet, a $CO_2$ inlet, and a miscible fluid outlet. The acid fluid inlet is connected with the acid fluid conveying unit, the $CO_2$ inlet is connected with the $CO_2$ conveying unit, the miscible fluid outlet is connected with the plate holder 12, the plate holder is successively connected with a back pressure valve 13 and a recycling fluid tank 14, and the recycling fluid tank is connected to the vacuum pump 17.

The $CO_2$ conveying unit comprises a $CO_2$ cylinder 1 and a gas booster pump 2 which is connected to the cylinder. A gas flowmeter 3 and a pressure sensor 4 are fixed on the pipe connected from the $CO_2$ cylinder to the gas booster pump. The outlet of the gas booster pump is connected to the gas inlet of the mixing tank 5. A valve switch is provided on the pipe between the gas booster pump and the mixing tank.

The acid fluid conveying unit includes an acid fluid tank 6 and a plunger pump 7 through which the acid fluid in the acid fluid tank is pumped into the mixing tank 5. A valve switch is provided on the pipe between the plunger pump and the mixing tank.

The mixing tank 5 is sealed and the externally wrapped with a heating jacket (not shown). The heating jacket is preferably a thermostatic water bath heating jacket to heat the fluid in the tank. A temperature sensor 8 and a pressure sensor 9 are provided in the tank. The miscible fluid outlet of the mixing tank is connected to a fluid flowmeter 10, a plunger pump 11 and a plate holder 12 in order. A valve switch is provided on the pipe between the mixing tank 5 and the fluid flowmeter 10. The fluid outlet of the plate holder is successively connected with a back pressure valve 13 and a recycling fluid tank 14. The pipe connected between the mixing tank and the plate holder is externally wrapped with an insulation layer 25 made of polyurethane. The recycling fluid tank 14 is internally provided with an electromagnetic level gauge 15 and a pressure sensor 16. The pressure of the gas booster pump and the temperature in the mixing tank are controlled to make the pressure and temperature in the mixing tank reach to the critical pressure and temperature of supercritical $CO_2$ to obtain supercritical $CO_2$, and the miscible fluid obtained is the mixture of supercritical $CO_2$ and acid fluid.

Figure 2:
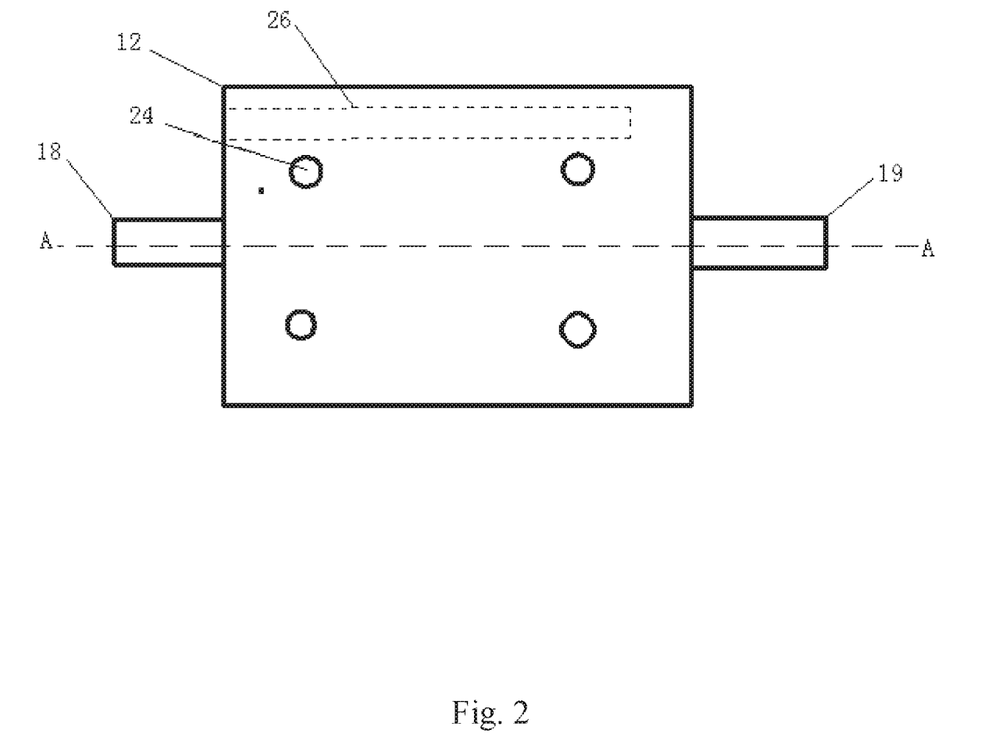
FIG. 2 is a front view of the plate holder.
Figure 3:
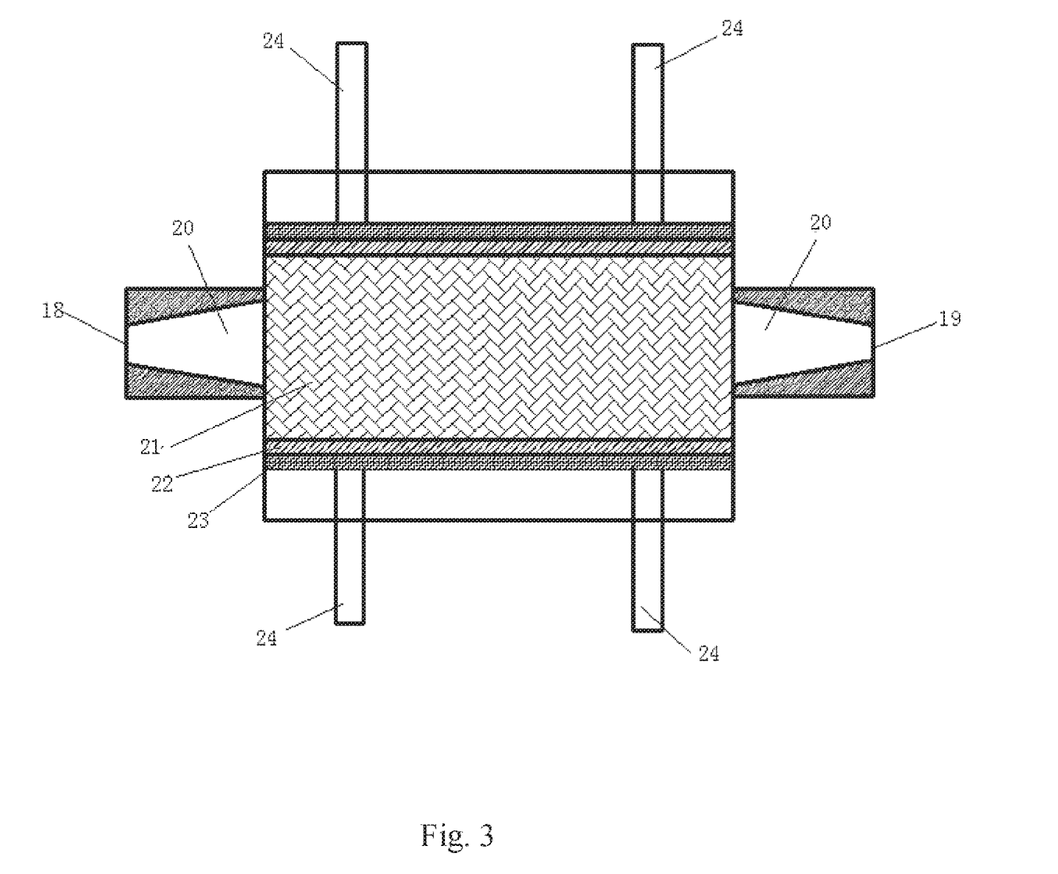
FIG. 3 is a top view of the plate holder shown in FIG. 2 after it is cut along A-A horizontal section.

As shown in FIGS. 2 and 3, the main body of the plate holder 12 is a rectangular box, the left and right ends of the box are respectively provided with a fluid inlet 18 and a fluid outlet 19, the internal flow channels 20 of the fluid inlet and fluid outlet are provided with flared guide grooves, the flared ends of the two grooves are opposite each other and facing to the interior of the plate holder, and a rock plate 21 installation cavity is arranged between the flared inlet guide groove and the flared outlet guide groove. The rock plates 21 are two identical rectangular rock plates cut from the formation rock, one plate is overlapped on the other plate, and the gap between the rock plates is simulated as the fracture. Anti-corrosion rubber 22 is attached on the opposite sides of the four sides of the plates after overlapping to seal the gap between the two plates. The gap openings of the other two opposite sides are taken as the inlet and outlet of the fluid respectively. The fluid inlet is directly connected to the flared inlet guide groove and the fluid outlet is connected to the flared outlet guide groove. The outer side of the rubber is covered with steel plate 23, the plate holder and the side opposite to the steel plate are fixed with at least four fastening screws 24, the tightness of the fastening screws can be adjusted to push the steel plate to press the rubber for sealing the sides of the rock plate. The left or the right side of the plate holder is provided with a heater hole 26 for inserting an electric heating rod.

As for the testing device for evaluating effects of $CO_2$ reaction rate of acid rock plate, its working principle for testing and calculating the reaction rate of the acid rock is as follows:

According to the Boyle-Mariotte law $PV_b = P_a V_a$, under the standard condition of 25° C. and $1.013 \times 10^5$ Pa the volume of $CO_2$ injected into the cylinder is:

$$V_b = \frac{P_a V_a}{P}. \quad (1)$$

The standard volume of $CO_2$ in the recycling fluid tank in any time is:

$$V'_j = \frac{P_j V_j}{P}. \quad (2)$$

The percentage of pumped miscible fluid at any time is:

$$\omega_j = \frac{V_c}{V_o}. \quad (3)$$

The standard volume of co-injected $CO_2$ participating in the reaction at any time is:

$$V_d = V_b \omega_j \quad (4).$$

The standard volume of $CO_2$ produced by acid rock reaction at any time is:

$$V_e = V'_j - V_d \quad (5).$$

The amount of substance of $CO_2$ produced by acid rock reaction at any time is:

$$n^j_{CO_2} = \frac{V_e}{V_m}. \quad (6)$$

According to the stoichiometric formula of acid rock reaction $2HCl \rightarrow CO_2 \uparrow$, the amount of substance of acid participating in the reaction at any time is:

$$n_{HCl}^j = 2 n_{CO_2}^j \quad (7).$$

The acid concentration after reaction at any time is:

$$C_j = \frac{C V_{HCl} - n^j_{HCl}}{V_{HCl}}. \quad (8)$$

The reaction rate of the acid rock is:

$$J = -\frac{Q}{A} \cdot (C_j - C) \cdot 10^{-3}. \quad (9)$$

Substitute Formulas (1), (2), (3), (4), (5), (6), (7) and (8) into Formula (9) gives the calculation formula of acid rock reaction rate:

$$J = \frac{2Q(P_j V_j - P_a V_a \omega_j)}{A P V_m V_{HCl}} \cdot 10^{-3}.$$

Where, P refers to the pressure under standard conditions, with a constant of $1.013 \times 10^5$ Pa; $P_a$ refers to refers to the pressure for injecting $CO_2$ into the $CO_2$ cylinder Pa; $P_j$ refers to the pressure of the recycling fluid tank at any time, in Pa, j=1, 2, . . . ; $V_a$ refers to the volume of $CO_2$ injected in the cylinder, in L; $V_b$ refers to the standard volume of $CO_2$ injected in the cylinder, in L; $V_c$ refers to the volume of miscible fluid injected, in L; $V_d$ refers to the standard volume of co-injected $CO_2$ participating in the reaction at any time, in L; $V_e$ refers to the standard volume of $CO_2$ produced by acid rock reaction at any time, in L; $V_j$ refers to the volume of $CO_2$ in the recycling fluid tank at any time, in L, j=1, 2, . . . ; $V'_j$ refers to the standard volume of $CO_2$ in the recycling fluid tank in any time, in L, j=1, 2, . . . ; $V_o$ refers to the volume of the mixing tank, in L; $n_{CO_2}^j$ refers to the amount of substance of $CO_2$ produced by acid rock reaction at any time, in mol; $V_m$ refers to the molar volume of gas under standard conditions, with a constant of 24.5, in L/mol; $n_{HCl}^j$ refers to the amount of substance of acid participating in the reaction at any time, in mol; C refers to the acid concentration before reaction, in mol/L; $V_{HCl}$ refers to the volume of acid participating in the reaction at any time, in L; $C_j$ refers to the acid concentration after reaction at any time, in mol/L; Q refers to the acid injection rate, in $cm^3/s$; A refers to the reaction area of acid rock, in $cm^2$; J refers to the reaction rate of the acid rock, in mol/s·$cm^2$.

The reaction rate of acid rock is calculated according to Formula (10), so that it is necessary to conduct experiments with the testing device for evaluating the effect of $CO_2$ on the reaction rate of acid rock plate to measure the parameters required by Formula (10), and calculate the reaction rate of the acid rock.

As for the testing method for using the testing device for evaluating the effect of $CO_2$ on the reaction rate of acid rock plate, the specific steps are as follows:

Step 1: installing the plate holder and the whole testing device to ensure the air tight sealing of the whole device; wherein the plate holder is installed in such a way that the rock taken from the reservoir is cut into a pair of rock plates that are slightly smaller than the inner cavity of the plate holder, with a length of 170 to 176 mm, a width of 35 to 36 mm, and a thickness of 25±5 mm; one plate is overlapped on the other plate, the gap between the rock plates is simulated as the fracture, the two sides of the rock plate along the direction of fluid flow are attached with anti-corrosion rubber, the outer side of the rubber is covered with steel plate and placed in the inner cavity of the plate holder, and the steel plate is fixed with fastening screws onto the side of the plate holder opposite to the steel plate.

Step 2: after the testing device is installed, turning on the vacuum pump to ensure that the whole testing device is completely vacuum in operation, and turning off the vacuum pump and zero the pressure gauge.

Step 3: starting the gas booster pump to inject gaseous $CO_2$ into the mixing tank with a certain displacement, recording the readings of the gas flowmeter 3 and the pressure sensor 4, using the plunger pump to inject acid fluid (hydrochloric acid) into the mixing tank with a certain displacement, recording the amount of acid fluid injected, adjusting and controlling the pressure and temperature in the mixing tank to reach to the supercritical pressure and temperature of $CO_2$, and uniformly mixing the supercritical $CO_2$ and the acid fluid to obtain the miscible fluid.

Step 4: after the temperature of the mixing tank is stable, setting the outlet back pressure, pumping the miscible fluid with the plunger pump into the plate holder to enable acid rock reaction, recording the volume of $CO_2$ in the recycling fluid tank, and finally calculating the reaction rate of the acid rock with the Formula (10).

In another embodiment, in the testing device of the present invention, a gas booster pump, a gas flowmeter, a mixing tank, all pressure sensors and temperature sensors, a plunger pump, a fluid flowmeter, a back pressure valve, an electromagnetic level gauge, and a vacuum pump all are connected to the data acquisition and control panel, and the data acquisition and control panel is connected to the computer. During the experiment, all data was transmitted to the computer through the data acquisition and control panel. The data acquisition control panel can realize intelligent device control and experimental data acquisition, and then the computer records and analyzes the data in real time.

The above are only the preferred embodiments of the present invention, and are not intended to limit the present invention in any form. Although the present invention has been disclosed as above with the preferred embodiments, it is not intended to limit the present invention. Those skilled in the art, within the scope of the technical solution of the present invention, can use the disclosed technical content to make a few changes or modify the equivalent embodiment with equivalent changes. Within the scope of the technical solution of the present invention, any simple modification, equivalent change and modification made to the above embodiments according to the technical essence of the present invention, are still regarded as a part of the technical solution of the present invention.

What is claimed is:

1. A testing method for evaluating effects of $CO_2$ reaction rate of an acid rock plate, comprising the following steps:

step 1: installing a plate holder and a testing device to ensure an air tight sealing of the testing device;
the testing device comprising an acid fluid conveying unit, a $CO_2$ conveying unit, a mixing tank, the plate holder, a recycling fluid tank, and a vacuum pump;
wherein the mixing tank comprises an acid fluid inlet, a $CO_2$ inlet, and a miscible fluid outlet; the acid fluid inlet is connected with the acid fluid conveying unit, the $CO_2$ inlet is connected with the $CO_2$ conveying unit, the miscible fluid outlet is connected with the plate holder, the plate holder is connected with the recycling fluid tank, and the recycling fluid tank is connected to the vacuum pump;
wherein the $CO_2$ conveying unit comprises a $CO_2$ cylinder and a gas booster pump which is connected to the cylinder; a gas flowmeter and a pressure sensor are fixed on a pipe connected from the $CO_2$ cylinder to the gas booster pump; an outlet of the gas booster pump is connected to the $CO_2$ inlet of the mixing tank;
wherein the mixing tank is sealed in such way that an external surface of the mixing tank is wrapped with a heating jacket, and a temperature sensor and a pressure sensor are provided inside the tank; the miscible fluid outlet of the mixing tank is connected to a fluid flowmeter, a plunger pump and the plate holder in order; a fluid outlet of the plate holder is successively connected with a back pressure valve and a recycling fluid tank; a pipe connected between the mixing tank and the plate holder is externally wrapped with an insulation layer; the recycling fluid tank is internally provided with an electromagnetic level gauge and a pressure sensor; a pressure of the gas booster pump and a temperature in the mixing tank are controlled to make the pressure and temperature in the mixing tank reach to a critical pressure and a critical temperature of supercritical $CO_2$ to obtain supercritical $CO_2$, and the obtained miscible fluid is the mixture of supercritical $CO_2$ and acid fluid;

step 2: turning on the vacuum pump to ensure that the whole testing device is completely vacuum in operation, and turning off the vacuum pump and zeroing the pressure gauge;

step 3: using the gas booster pump to inject gaseous $CO_2$ into the mixing tank with a certain displacement, recording the readings of the pressure sensor and the gas flowmeter, using the plunger pump to inject hydrochloric acid into the mixing tank with a certain displacement, controlling the pressure and temperature in the mixing tank to reach to the supercritical pressure and temperature of $CO_2$, and uniformly mixing the supercritical $CO_2$ and the acid fluid to obtain the miscible fluid;

step 4: after the temperature of the mixing tank is stable, setting the outlet back pressure, pumping the miscible fluid with the plunger pump into the plate holder to enable acid rock reaction, recording the volume of $CO_2$ in the recycling fluid tank at any time, and finally calculating the reaction rate of the acid rock at any time with the following formula:

$$J = \frac{2Q(P_j V_j - P_a V_a \omega_j)}{A P V_m V_{HCl}} \cdot 10^{-3};$$

where, J refers to a reaction rate of acid rock mol/s·cm²;
Q refers to acid injection rate, in cm³/s;
$V_j$ refers to the volume of $CO_2$ in the recycling fluid tank at any time, in L, j=1, 2, . . . ;
$P_j$ refers to the pressure of the recycling fluid tank at any time, in Pa, j=1, 2, . . . ;
$P_a$ refers to the pressure for injecting $CO_2$ into the $CO_2$ cylinder, in Pa;
$V_a$ refers to the volume of $CO_2$ injected in the $CO_2$ cylinder, in L;
$\omega_j$ refers to the percentage of pumped miscible fluid at any time;
A refers to the reaction area of acid rock, in cm²;
P refers to the pressure under standard conditions, with a constant of 1.013×10⁵ in Pa;
$V_m$ refers to the molar volume of gas under standard conditions, with a constant of 24.5, in L/mol;
$V_{HCl}$ refers to the volume of acid participating in the reaction at any time, in L.

2. The testing method for evaluating effects of $CO_2$ reaction rate of an acid rock plate according to claim 1, wherein a derivation of the calculation formula of the reaction rate of the acid rock is as follows:

according to the Boyle-Mariotte law $PV_b = P_a V_a$, under a standard condition of 25° C. and 1.013×10⁵Pa the volume of $CO_2$ injected into the cylinder is:

$$V_b = \frac{P_a V_a}{P};  \quad (1)$$

a standard volume of $CO_2$ in the recycling fluid tank in any time is:

$$V'_j = \frac{P_j V_j}{P};  \quad (2)$$

a percentage of pumped miscible fluid at any time is:

$$\omega_j = \frac{V_c}{V_o};  \quad (3)$$

a standard volume of co-injected $CO_2$ participating in the reaction at any time is:

$$V_d = V_b \omega_j  \quad (4).$$

a standard volume of CO2 produced by acid rock reaction at any time is:

$$V_e = V'_j - V_d  \quad (5).$$

an amount of substance of CO2 produced by acid rock reaction at any time is:

$$n^j_{CO_2} = \frac{V_e}{V_m};  \quad (6)$$

according to the stoichiometric formula of acid rock reaction 2HCl→$CO_2$↑, an amount of substance of acid participating in the reaction at any time is:

$$n_{HCl}{}^j = 2n_{CO_2}{}^j  \quad (7).$$

an acid concentration after reaction at any time is:

$$C_j = \frac{CV_{HCl} - n^j_{HCl}}{V_{HCl}};  \quad (8)$$

the reaction rate of the acid rock is:

$$J = -\frac{Q}{A} \cdot (C_j - C) \cdot 10^{-3};  \quad (9)$$

substitute Formulas (1), (2), (3), (4), (5), (6), (7) and (8) into Formula (9) gives the calculation formula of acid rock reaction rate:

$$J = \frac{2Q(P_j V_j - P_a V_a \omega_j)}{A P V_m V_{HCl}} \cdot 10^{-3};$$

where, P refers to the pressure under standard conditions, with a constant of 1.013×10⁵ Pa; $P_a$ refers to refers to the pressure for injecting $CO_2$ into the $CO_2$ cylinder Pa; $P_j$ refers to the pressure of the recycling fluid tank at any time, in Pa, j=1, 2, . . . ; $V_a$ refers to the volume of $CO_2$ injected in the cylinder, in L; $V_b$ refers to the standard volume of $CO_2$ injected in the cylinder, in L; $V_c$ refers to the volume of miscible fluid injected, in L; $V_d$ refers to the standard volume of co-injected $CO_2$ participating in the reaction at any time, in L; $V_e$ refers to the standard volume of $CO_2$ produced by acid rock reaction at any time, in L; refers to the volume of $CO_2$ in the recycling fluid tank at any time, in L, j=1, 2, . . . ; $V_j$ refers to the standard volume of $CO_2$ in the recycling fluid tank in any time, in L, j=1, 2, . . . ; $V_o$ refers to the volume of the mixing tank, in L; $n_{CO_2}{}^j$ refers to the amount of substance of $CO_2$ produced by acid rock reaction at any time, in mol; $V_m$ refers to the molar volume of gas under standard conditions, with a constant of 24.5, in L/mol; $n_{HCl}{}^j$ refers to the amount of substance of acid participating in the reaction at any time, in mol; C refers to the acid concentration before reaction, in mol/L; $V_{HCl}$ refers to the volume of acid participating in the reaction at any time, in L; $C_j$ refers to the acid concentration after reaction at any time, in mol/L; Q refers to the acid injection rate, in cm³/s; A refers to the reaction area of acid rock, in cm²; J refers to the reaction rate of the acid rock, in mol/s·cm².

3. The testing method for evaluating effects of $CO_2$ reaction rate of an acid rock plate according to claim 1, wherein in step 1, the plate holder is installed in such a way that one rock plate is overlapped on a second rock plate, the gap between the rock plates is simulated as the fracture, the two sides of the rock plate along the direction of fluid flow are attached with anti-corrosion rubber, the outer side of the rubber is covered with steel plate and placed in the inner cavity of the plate holder, and the steel plate is fixed with fastening screws onto the side of the plate holder opposite to the steel plate.

* * * * *